J. E. PARKER.
MEANS FOR ATTACHING ELECTRICAL APPLIANCES TO CONDUIT OUTLET BOXES.
APPLICATION FILED JUNE 19, 1911.
1,229,651.
Patented June 12, 1917.
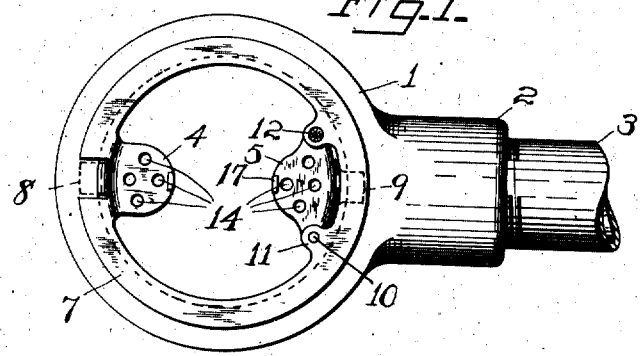
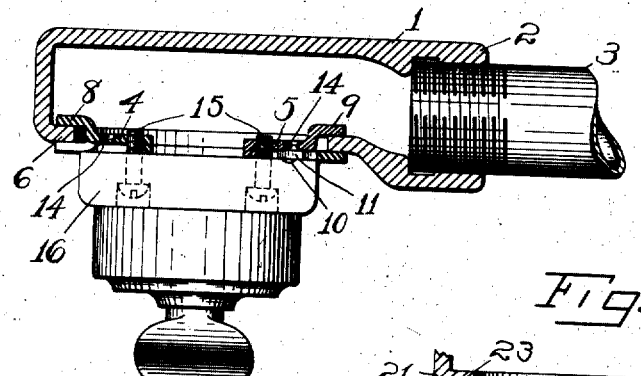
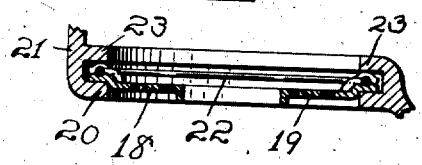
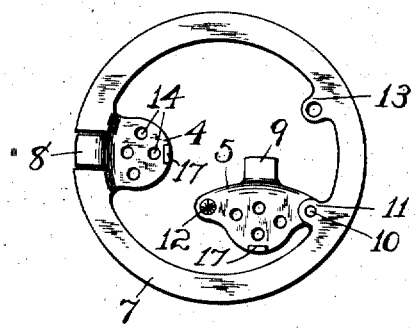
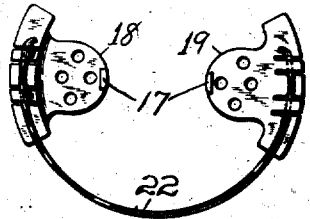
WITNESSES:
INVENTOR.
John E. Parker
ATTORNEYS

UNITED STATES PATENT OFFICE.

JOHN E. PARKER, OF SYRACUSE, NEW YORK, ASSIGNOR TO CROUSE-HINDS COMPANY, OF SYRACUSE, NEW YORK, A CORPORATION OF NEW YORK.

MEANS FOR ATTACHING ELECTRICAL APPLIANCES TO CONDUIT OUTLET-BOXES.

1,229,651.        Specification of Letters Patent.        Patented June 12, 1917.

Application filed June 19, 1911. Serial No. 633,984.

*To all whom it may concern:*

Be it known that I, JOHN E. PARKER, of Syracuse, in the county of Onondaga and State of New York, have invented a certain new and useful Means for Attaching Electrical Appliances to Conduit Outlet-Boxes, of which the following is a specification.

This invention has for its object the production of means for attaching electrical appliances to conduit outlet boxes; and it consists in the combinations and constructions hereinafter set forth and claimed.

In describing this invention reference is had to the accompanying drawing in which like characters designate corresponding parts in all the views.

Figure 1 is a plan of one form of outlet box provided with a preferable construction of my invention.

Fig. 2 is a longitudinal sectional view of parts shown in Fig. 1, an electrical appliance being shown.

Fig. 3 is a detail view of the means for attaching an electrical appliance to the box, the box and the electrical appliance being omitted.

Fig. 4 is a fragmentary view of a box provided with another form of my invention.

Fig. 5 is a detail view of the attaching means shown in Fig. 4.

1 is the conduit outlet box having means as an internally threaded nipple 2 for connection with the conduit 3 which incloses the electric conduit wires connected to the appliance carried by the box 1, the box also having an opening in one side thereof in which is located the means for attaching the electrical appliance. The box may be of any desirable form, size and construction.

The means for attaching the electrical appliance to the box comprises, generally, two members for engaging opposite portions of the margin of the wall around the opening of the outlet box, and a part connecting said members, one of the members being movable relatively to the other into and out of interlocking engagement with said margin.

4 and 5 are, respectively, the members for interlocking with the margin 6 of the wall around the opening of the box 1, and 7 is the part connecting said members 4, 5, said members having lugs 8, 9 for interlocking with the margin 6. Usually the connecting part 7 follows along the margin 6 and engages the outer face thereof. Said part is here shown as a ring shaped body but obviously may be a segment as seen in Fig. 5.

The member 4 is usually integral with the body 7 and the lug 8 is struck from the body 7 and offset therefrom in position to engage the inner face of the margin 6.

The member 5 is here shown as pivoted at 10 to an inwardly extending lug 11 on the body 7 and movable on its pivot 10 away from and toward the center of the ring 7 to carry its lug 9 into and out of interlocking engagement with the margin 6, the lug 9 being offset from the major part of such member 5 in order to engage the inner face of said margin 6.

The member 5 is held in its operative position by suitable means as a screw or other fastening device 12 passing through its end farthest removed from the pivot 10 and through a lug 13 similar to the lug 11 on the body 7.

The members 4 and 5 are also provided with a plurality of sets of holes 14 located different distances from the center of the body 7 in order that one set will be spaced the proper distance apart to receive the screws 15 of an electrical appliance as a snap switch 16, the screws 15 of the different makes of switches being located different distances from the center, as will be understood by those skilled in the art. The members 4, 5 are offset from the plane of the body or ring 7 so that they are substantially flush with the outer face of the margin 6 of the box and are formed with raised surfaces located at the ends of lugs 17, which surfaces are flush with the outer face of the ring 7 so that the base of the appliance 16 engages said surfaces when said base is clamped against the ring 7.

The body 7 can be turned in any position in the opening of the margin 6 in order that the sight opening of any particular make of switch may be in position to be conveniently read, it being understood that such openings bear different relative positions to the fastening means in various makes of commercial switches.

After the body or ring 7 has been placed in the opening so that the lug 9 is interlocked with the margin 6, the member 5 is swung on its pivot 10 from the position shown in Fig. 3 to its position shown in Fig. 1, and the fastening member 12 is screwed into position.

In Figs. 4 and 5 is shown another form of my invention in which the members 18 and 19 for interlocking with the margin 20 of the wall around the opening of the outlet box 21 are connected by a resilient part or body as a spring 22 and are fixed to the ends of such spring, the spring 22 following along the margin 20 and being usually located in a channel formed by said margin 20 and flange, 23 opposed to the inner face of such margin.

What I claim is:

1. The combination with a conduit outlet box having an opening, of means for attaching an electrical appliance having fastening screws to the box, said means comprising members having parts for interlocking with the margin of the wall around said opening, the members being formed with holes for said screws, one of said members being fixed and the other movable relatively to the fixed member into and out of interlocking engagement with said margin and thereby permitting said means to be moved to carry the other of said members into and out of interlocking engagement with said margin, substantially as and for the purpose described.

2. The combination with a conduit outlet box having an opening, of means for attaching an electrical appliance having fastening screws to the box, said means comprising members having parts for interlocking with the margin of the wall around the opening, the members being formed with holes for said screws, and one member being pivoted and movable on its pivot into and out of interlocking engagement with said margin to permit said means to be shifted bodily to engage and disengage the other of said parts and the margin, substantially as and for the purpose specified.

3. The combination with a conduit outlet box having an opening, of means for attaching an electrical appliance having fastening screws, said means comprising members provided with lugs offset from the body for engaging the inner face of the margin of the wall around the opening, the members being also provided with a plurality of holes for said screws, one of the members being fixed, and the other being pivoted to the body, substantially as and for the purpose set forth.

4. The combination with a conduit outlet box having an opening, of means for attaching an electrical appliance having fastening screws to the box, said means comprising members extending into the opening and formed with holes for the screws, and a body carrying said members and arranged to overlie the margin of the wall around the opening, said means being formed with lugs offset from the body and arranged to extend under and engage the inner side of said margin, one of the lugs being provided on one of said members and said member being pivoted and movable on its pivot for carrying its lug into and out of interlocking engagement with said margin, substantially as and for the purpose described.

5. The combination with a conduit outlet box having an opening, of means for attaching an electric appliance having fastening screws to the box, said means comprising a body for resting on the margin of the wall around the opening and members arranged to extend into the opening below the plane of the outer surface of said margin around said opening, and formed with holes for the screws and also with raised surfaces extending toward said plane for engaging the bottom of the electric appliance thereby bracing said members and holding the same from tilting during the turning of the screws into the holes of said members, substantially as and for the purpose set forth.

6. The combination of a conduit outlet box having an opening in one side thereof, and means for attaching an electric appliance having fastening screws to the open side of the box, said means comprising members interlocking with the margin of the wall around the opening and located below the plane of the outer face of said margin and having holes for said screws and raised surfaces for engaging the bottom of the base of the appliance and thereby bracing said members against tilting and holding the same with their holes in alinement with the screws during the turning of the screws into the holes, substantially as and for the purpose described.

7. The combination with a conduit outlet box having an opening, of means for attaching an electrical appliance having fastening screws to the open side of the box, said means comprising members extending into the opening and provided with fixed lugs arranged to lap the inner face of said margin, the members being also provided with screw holes for said screws, substantially as and for the purpose described.

In testimony whereof, I have hereunto signed my name in the presence of two attesting witnesses, at Syracuse, in the county of Onondaga, in the State of New York, this 10th day of June 1911.

JOHN E. PARKER.

Witnesses:
C. C. SCHOENECK,
WM. CORNELL BLANDING.